United States Patent
Kolar (10) Patent No.: US 11,084,476 B2
(45) Date of Patent: Aug. 10, 2021

(54) VACUUM BRAKE BOOSTER FOR A VEHICLE BRAKING SYSTEM

(71) Applicant: ZF Active Safety GmbH, Koblenz (DE)

(72) Inventor: Jaroslav Kolar, Jablonec nad Nisou (CZ)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/976,171

(22) PCT Filed: Feb. 12, 2019

(86) PCT No.: PCT/EP2019/053365
§ 371 (c)(1),
(2) Date: Aug. 27, 2020

(87) PCT Pub. No.: WO2019/166215
PCT Pub. Date: Sep. 6, 2019

(65) Prior Publication Data
US 2020/0406876 A1 Dec. 31, 2020

(30) Foreign Application Priority Data
Feb. 28, 2018 (DE) ...................... 10 2018 001 564.6

(51) Int. Cl.
*B60T 13/52* (2006.01)
*B60T 13/569* (2006.01)
*B60T 13/57* (2006.01)

(52) U.S. Cl.
CPC ............ *B60T 13/52* (2013.01); *B60T 13/569* (2013.01); *B60T 13/57* (2013.01)

(58) Field of Classification Search
CPC ......... B60T 13/52; B60T 13/569; B60T 13/57
See application file for complete search history.

(56) References Cited

U.S. PATENT DOCUMENTS

| 6,422,124 B1 * | 7/2002 | Schonlau | B60T 8/3275 91/369.2 |
| 6,477,935 B1 * | 11/2002 | Schonlau | B60T 8/3275 91/376 R |
| 7,066,073 B1 * | 6/2006 | Wagner | B60T 13/57 91/376 R |

(Continued)

FOREIGN PATENT DOCUMENTS

| DE | 3812452 A1 | 11/1988 |
| DE | 102014215697 A1 | 2/2016 |

(Continued)

*Primary Examiner* — Thomas E Lazo
(74) *Attorney, Agent, or Firm* — Robert James Harwood (57) ABSTRACT

A vacuum brake booster includes: at least one movable wall, which separates a working chamber and a vacuum chamber in the vacuum brake booster from one another, and a control valve unit, which is coupled to the at least one movable wall, the control valve unit comprising a guide sleeve and an actuation piston guided displaceably in the control valve unit, which actuation piston is actuatable by way of a force input member which can be coupled in particular to a brake pedal, the actuation piston having at least one first valve seat, which in the open state is used to connect the working chamber to the ambient atmosphere.

10 Claims, 12 Drawing Sheets

(56) References Cited

U.S. PATENT DOCUMENTS

| | | | | |
|---|---|---|---|---|
| 8,210,091 | B2* | 7/2012 | Anderson | B60T 13/57 91/369.3 |
| 8,746,127 | B2* | 6/2014 | Grace | B60T 13/57 91/376 R |

FOREIGN PATENT DOCUMENTS

| | | |
|---|---|---|
| DE | 102015001981 A1 | 8/2016 |
| EP | 1323606 A1 | 7/2003 |
| WO | 0018627 A1 | 4/2000 |
| WO | 2008090934 A1 | 7/2008 |

* cited by examiner

VACUUM BRAKE BOOSTER FOR A VEHICLE BRAKING SYSTEM

CROSS-REFERENCE TO RELATED APPLICATION

This application is a national stage of International Application No. PCT/EP2019/053365, filed Feb. 12, 2019, the disclosure of which is incorporated herein by reference in its entirety, and which claimed priority to German Patent Application No. 102018001564.6, filed Feb. 28, 2018, the disclosure of which is incorporated herein by reference in its entirety.

TECHNICAL FIELD

The present disclosure relates to a vacuum brake booster for a vehicle brake system.

BACKGROUND

Vacuum brake boosters for vehicle brake systems are known from the prior art. The document WO 00/18627 A1 discloses a vacuum brake booster having a valve piston, a control housing and a disk valve connected to the valve piston. Also provided is an air filter for purification and noise deadening of the external air entering the vacuum housing. The air filter is arranged in the valve piston and, in conjunction with an associated valve piston sealing seat for the air filter lying thereagainst, forms a variable inflow cross section for the external air flowing through the disk valve.

It is furthermore known, from the document EP 1 323 606 A1, for the air stream entering the housing of the vacuum brake booster to be controlled by means of a flow control valve composed of elastic material. The flow control valve may be produced from an elastic material such as, for example, rubber. The flow control valve is attached to a carrier element for the valve element of the vacuum brake booster, wherein the valve element interacts with a valve seat which, depending on the opening position, connects the working chamber to the atmosphere or separates it from the atmosphere. The flow control valve is equipped with a slot for limiting the flow rate of the inflowing air.

The elements known from the prior art for controlling the inflowing air, such as air filters or valves produced from elastic material, are susceptible to wear or contamination and can therefore impair the function of the brake booster.

SUMMARY

It is an object of the present disclosure to provide a vacuum brake booster with which the inflowing air can be controlled easily and without the use of components which are susceptible to wear and/or contamination.

Said object is achieved according to the present disclosure by means of a vacuum brake booster having the features specified in patent claim 1. Further advantageous embodiments are specified in the dependent claims.

The vacuum brake booster according to the present disclosure has at least one movable wall which separates a working chamber and a vacuum chamber in the vacuum brake booster from one another, and a control valve unit which is coupled to the at least one movable wall. The control valve unit comprises a guide sleeve and a valve piston or actuating piston which is guided displaceably in the control valve unit and which is actuatable by means of a force input member which may be designed in particular for coupling to a brake pedal. The actuating piston has at least one first valve seat which, in the opened state, serves for connecting the working chamber to the atmosphere. The actuating piston has a first flow control portion, which projects in the direction of the guide sleeve. The guide sleeve is equipped with a second flow control portion, which projects in the direction of the actuating piston. The first flow control portion and the second flow control portion interact for the purposes of controlling the air stream flowing to the first valve seat.

During an actuation of the vacuum brake booster, an air stream can flow via the opening first valve seat on the actuating piston into the working chamber of the vacuum brake booster in order to build up a pressure difference between the working chamber, which is connected via the first valve seat to the atmosphere, and the vacuum chamber. Owing to this pressure difference, the movable wall moves in order to generate a boost force which can be transmitted to a downstream master brake cylinder. With the flow control portions respectively provided on the actuating piston and on the guide sleeve, the air stream entering the vacuum brake booster can be controlled easily without the use of components which are susceptible to wear, such as air filters or valves composed of elastic materials. Through the control of the air stream by means of the flow control portions, undesired noises and vibrations of the brake pedal can be reliably prevented without functional impairment.

The first flow control portion and the second flow control portion may between them define at least one flow channel for the air flowing to the first valve seat. Here, the first flow control portion and the second flow control portion may overlap in an axial direction. The flow channel may have a predetermined, for example annular cross section. The flow channel may be defined by a radial and/or axial spacing between the first flow control portion and the second flow control portion. For example, the flow channel may, during the normal operation of the vacuum brake booster, be defined by a radial spacing between the first flow control portion and the second flow control portion. During an emergency braking operation, the cross section of the flow channel can be enlarged by means of the flow control portions in order to quickly allow the greatest possible air stream to enter the working chamber of the vacuum brake booster. In this way, a large pressure difference can be rapidly built up between the working chamber and the vacuum chamber in order to be able to as quickly as possible provide a high boost force by means of the vacuum brake booster. The flow channel may be established between the two flow channels even in the non-actuated state of the vacuum brake booster. In other words, it is then the case that an air stream to the first valve seat is not entirely prevented in any position of the two flow control portions.

The first flow control portion and the second flow control portion may be designed such that the cross section of the at least one flow channel varies in a manner dependent on the extent of a relative movement between the actuating piston and the guide sleeve. For example, the flow channel cross section may remain constant up to a relative movement of a predetermined extent and increase in the event of the predetermined extent being overshot. The variation of the flow channel cross section may be largely dependent on the actuating force exerted by means of, for example, a brake pedal on the vacuum brake booster, because the actuating force has a direct influence on the extent of the relative movement between the actuating piston and the guide sleeve. If the actuating force lies in a range corresponding to a normal braking operation, the cross section of the flow channel may thus remain constant. If the actuating force exceeds a threshold value, for example in the case of an emergency braking operation, the cross section of the flow channel may be enlarged by means of the flow control portions in order to allow the greatest possible air stream to the valve seat. Such a high actuating force leads to a correspondingly large relative movement between the actuating piston and the guide sleeve, such that, in the case of a high actuating force, the first flow control portion and the second flow control portion can also perform a relatively large relative movement and enlarge the flow channel cross section. The cross section of the flow channel can also be reduced in size again by means of the flow control portions when the actuating force is reduced or the brake pedal is released entirely.

The first flow control portion and the second flow control portion may be designed such that, during a relative movement between the actuating piston and the guide sleeve, the cross section of the at least one flow channel remains constant over a predetermined distance of the relative movement and increases in the event of the predetermined distance being overshot. The first flow control portion and the second flow control portion may each have a predetermined axial extent. The distance of the relative movement over which the cross section of the flow channel remains constant may be dependent on the axial extent of the first flow control portion and of the second flow control portion. The axial extent of the two flow control portions may be coordinated with one another.

The two flow control portions may overlap in an axial direction. The two flow control portions preferably overlap in an overlap region with a predetermined axial extent. The axial extent of this overlap region may predefine the distance of the relative movement over which the cross section of the flow channel remains constant. As soon as the two flow control portions no longer overlap, or overlap only slightly, in an axial direction owing to a relative movement having occurred between the actuating piston and the guide sleeve, the cross section of the flow channel can increase in size. This may be the case for example during an emergency braking operation, in the case of which the air stream to the first valve seat should no longer be controlled or throttled, but rather a maximum air stream should be able to reach and flow through the valve seat.

The first flow control portion and the second flow control portion may however also overlap in all operating states of the vacuum brake booster. In other words, the first flow control portion and the second flow control portion may always overlap irrespective of the magnitude of the relative movement between the actuating piston and the guide sleeve. The distance-dependent control of the flow channel cross section may in this case be realized by means of at least one element for varying the flow channel cross section. The first flow control portion and/or the second flow control portion may have at least one such element for varying the flow channel cross section. It is also possible for multiple elements for varying the flow channel cross section to be provided. The at least one element may be an opening, a recess or an incision in the first flow control portion and/or in the second flow control portion. The at least one element for varying the flow channel cross section may also be a bevel on the first flow control portion and/or the second flow control portion. The element for varying the flow channel cross section may in particular be provided on an axial end portion of one of the two flow control portions. Proceeding from an axial end surface or end side of one of the flow control portions, the element for varying the flow channel cross section may extend axially into one of the flow control portions. The element for varying the flow channel cross section may become continuously smaller the further it extends in an axial direction into the corresponding flow control portion. Preferably, the element may be a recess or an opening in an end portion of one of the two flow control portions. The element for varying the cross section of the flow channel may be a curved recess. The curved recess may have a wall which runs obliquely inward or so as to be inclined toward the central axis of the guide sleeve.

The at least one element for varying the flow channel cross section may be designed such that the cross section of the flow channel increases further the greater the relative movement between the actuating piston and the guide sleeve. The element for varying the flow channel cross section may for example be formed on the flow control portion of the guide sleeve. If the guide sleeve and the actuating piston are moved relative to one another, the first flow control portion provided on the actuating piston may, owing to the relative movement, open up a part or even the entire element for varying the flow channel cross section, such that the flow channel cross section increases in size in a manner dependent on the distance of the relative movement between the guide sleeve and the actuating piston. In this case, too, it is the case that the cross section of the flow channel becomes larger with increasing extent of the relative movement between the actuating piston and the guide sleeve and thus between the first flow control portion and the second flow control portion.

The first flow control portion may be formed on the actuating piston radially inwardly of the valve seat. The first flow control portion may have a predetermined radial spacing to the first valve seat. The first flow control portion may project into the second flow control portion. In an initial position of the vacuum brake booster, the second flow control portion may extend in a radial direction between the first flow control portion and the first valve seat. The first flow control portion may have the form of an annularly encircling projection on the actuating piston.

The second flow control portion may be of tubular form. The second flow control portion may receive the first flow control portion at least in certain portions. The second flow control portion may be longer than the first flow control portion. The element for varying the flow channel cross section may be provided on the second flow control portion. The element for varying the flow channel cross section may be formed in the manner of one or more recesses on the axial end of the second flow control portion. The axial recesses may be distributed uniformly around the circumference of the flow control portion.

The flow channel may be formed between an outer surface of the first flow control portion and an inner surface of the second flow control portion. Alternatively, the flow channel may be formed between an inner surface of the first flow control portion and an outer surface of the second flow control portion. The two flow control portions may be formed such that the flow channel is formed between an outer circumferential surface of the first flow control portion and an inner circumferential surface of the second flow control portion or an inner circumferential surface of the first flow control portion and an outer circumferential surface of the second flow control portion. The flow channel may, in an initial position of the vacuum brake booster, have the form of an annular space. The first flow control portion may project into the second flow control portion.

At least one valve element which interacts with the at least one first valve seat may be provided. The at least one valve element may bear against the second flow control portion. The at least one valve element serves, in a manner dependent on the state of actuation of the vacuum brake booster, for connecting the working chamber to the atmosphere or for connecting the working chamber to the vacuum chamber. The second control portion may extend through the valve element. The valve element may bear sealingly against the outer circumferential surface of the second flow control portion. For this purpose, the valve element may be equipped with a sealing lip. The valve element may also interact with a second valve seat, wherein the second valve seat may be formed on the control valve housing. Said second valve seat serves for connecting the working chamber to the vacuum chamber.

The present disclosure furthermore relates to a vehicle brake system having a vacuum brake booster of said type.

BRIEF DESCRIPTION OF THE DRAWINGS

Two exemplary embodiments of a vacuum brake booster will be described in more detail below on the basis of the appended schematic figures, in which.

DETAILED DESCRIPTION

Figure 1:
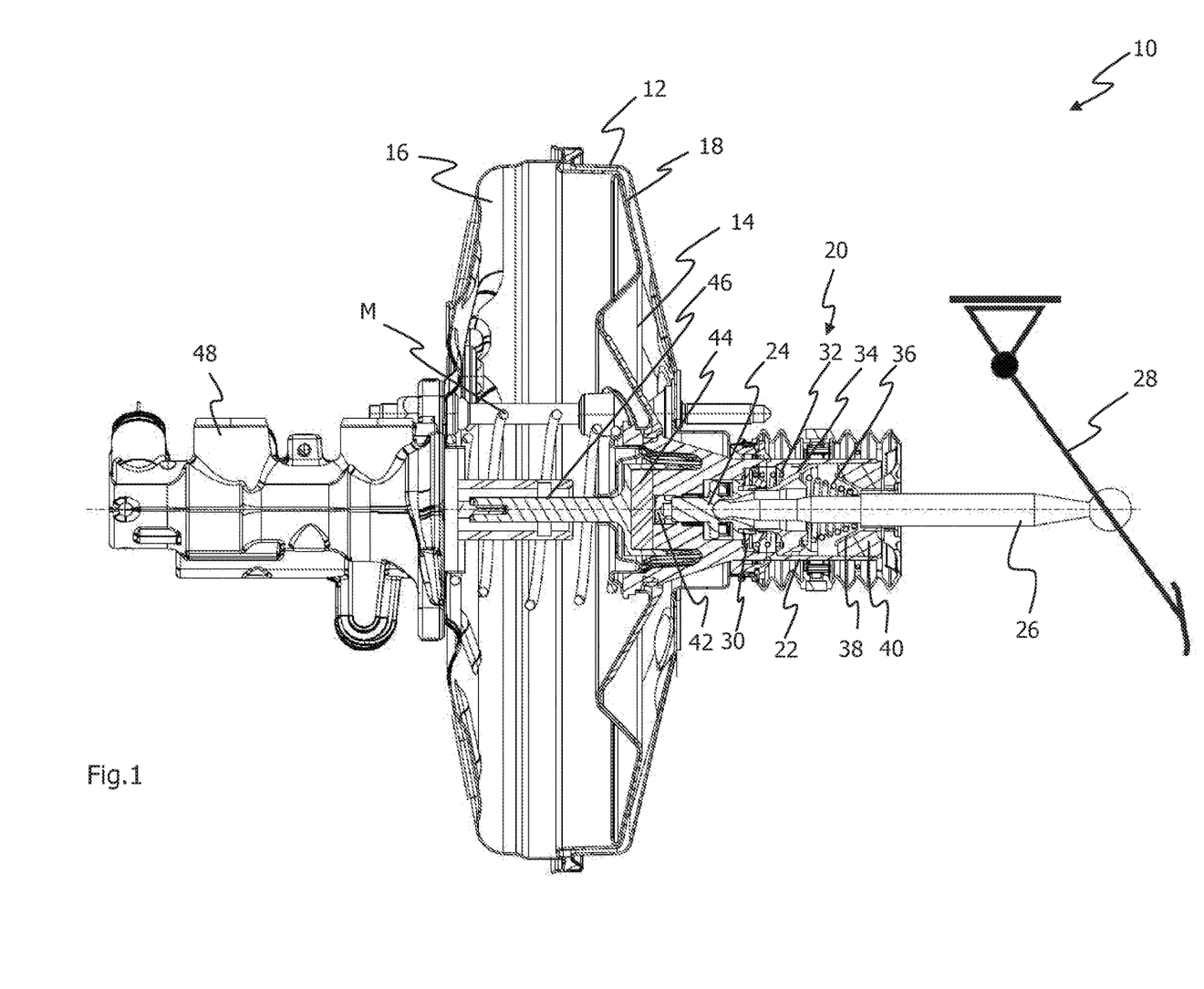
FIG. 1 shows a view of a vacuum brake booster having a control valve unit according to a first exemplary embodiment.

FIG. 1 shows a side view of a vacuum brake booster 10. The vacuum brake booster 10 has a booster housing 12 in which a working chamber 14 and a vacuum chamber 16 are delimited. The vacuum chamber 16 may be connected to a vacuum source (not shown). Provided between the working chamber 14 and the vacuum chamber 16 is a movable wall 18 which separates the working chamber 14 from the vacuum chamber 16. The movable wall 18 is connected to a control valve unit 20 by means of which the working chamber 14 can be connected to the atmosphere, that is to say to the outside air. This is necessary for example during an actuation of the vacuum brake booster 10 in order to be able to generate a boost force by means of a pressure difference, acting on the movable wall 18, between the working chamber 14 and the vacuum chamber 16. Furthermore, by means of the control valve unit 20, the working chamber 14 and the vacuum chamber 16 can be connected to one another in order to equalize a prevailing pressure difference. In other words, the control valve unit 20 can in this case produce a connection between the working chamber 14 and a vacuum source connected to the vacuum chamber 16, for example in the event of a release of the brake pedal 28, in order to evacuate the working chamber 14 and thus prepare for a new braking operation.

The control valve unit 20 has a control valve housing 22 in which an actuating piston 24 is displaceably received. The actuating piston 24 is coupled to a force input member 26. The force input member 26 is coupled or couplable to a brake pedal 28. In the control valve housing 22, aside from the actuating piston 24, there are also arranged a valve element 30, a spring 32, a guide sleeve 34, a resetting spring 36, a coupling element 38 and an air filter 40. The coupling element 38 couples the resetting spring 36 to the force input member 26. The force input member 26 extends through the valve element 30, the spring 32, the guide sleeve 34, the resetting spring 36, the coupling element 38 and the air filter 40 in order to be able to transmit an actuating force, which is exerted on the force input member 26 by the brake pedal 28, to the actuating piston 24. The actuating piston 24 can in turn transmit the actuating force via a plunger 42, which is attached thereto, to a reaction component 44. The reaction component 44 is received in a pot-shaped portion of a transmission element 46 which transmits the actuating force, which is imparted by means of the brake pedal 28, and the boost force, which is generated by the vacuum brake booster 10, to a master brake cylinder 48 which is positioned downstream of the vacuum brake booster 10. Extending within the housing 12 is a spring 50 which preloads the movable wall 18 and the control valve housing 22 into their initial position.

Figure 2:
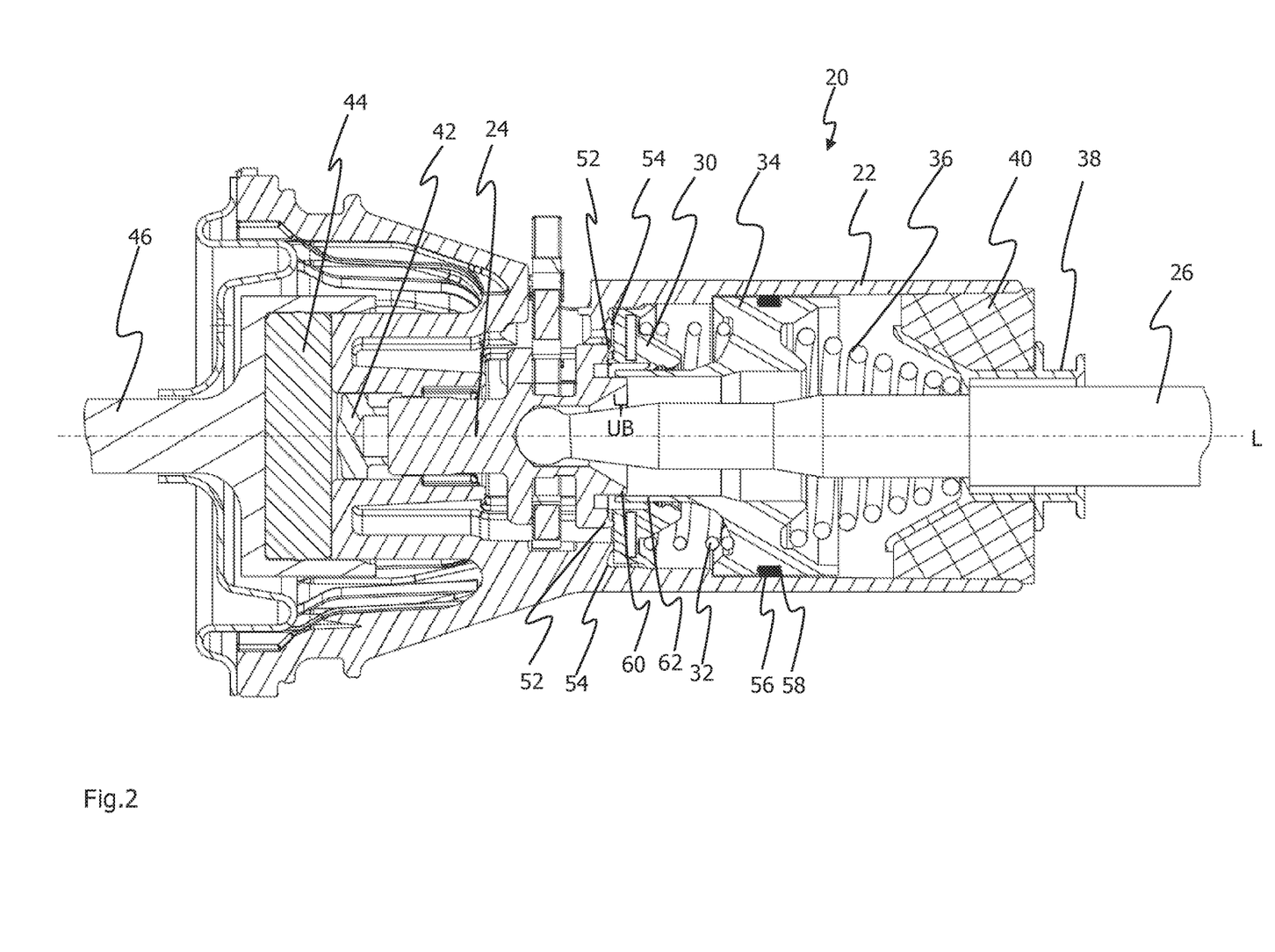
FIG. 2 shows an enlarged view of a control valve unit according to the first exemplary embodiment.

FIG. 2 shows an enlarged view of the control valve unit 20 in longitudinal section. On the actuating piston 24, there is formed a first valve seat 52 which interacts with the valve element 30. As a result of opening the first valve seat 52, that is to say as a result of a lift-off of the valve seat 52 from the valve element 30, the working chamber 14 is (see FIG. 1), connected to the surrounding atmosphere. An air flow entering the control valve housing 22 through the air filter 40 can then flow past the first valve seat 52 into the working chamber 14. In this way, owing to the pressure difference between the working chamber 14 and the vacuum chamber 16, the movable wall 18 is moved to the left in FIG. 1 in order to generate a boost force and transmit this to the master brake cylinder 48.

Formed on the control valve housing 22 is a second valve seat 54 which likewise interacts with the valve element 30. As a result of opening the second valve seat 54, the working chamber 14 can be connected to the vacuum chamber 16 in order to build up a pressure difference that prevails between the chambers 14 and 16. This is the case for example in the event of a release of the brake pedal 28. Then, control valve unit 20 is moved back into its initial position owing to the resetting force of the spring 50. The resetting spring 36 pushes the force input member 26 back into its initial position, wherein the valve element 30 is lifted off from the second valve seat 54. In this way, a connection is produced between the working chamber 14 and the vacuum chamber 16, and the working chamber 14 can be evacuated.

The spring 32 preloads the sealing element 30 against the two valve seats 52, 54. For this purpose, the spring 32 is supported on the guide sleeve 34. On the guide sleeve 34, there is provided a seal 56, which may be formed for example in the manner of an O-ring. The seal 56 is received in a groove 58 of the guide sleeve 34. Extending between the guide sleeve 34 and the coupling element 38 is the spring 36, which preloads the force input member 26 into its initial position. The spring 36 is supported on the coupling element 38 and extends in certain portions within a conical portion of the coupling element 38. The coupling element 38 is supported on a step on the force input member 26 and furthermore holds the air filter 40 in its predetermined position.

The actuating piston 24 has a first flow control portion 60, which extends along the axis L in the direction of the guide sleeve 34. Formed on the guide sleeve 34 is a second flow control portion 62, which extends in the direction of the actuating piston 24. The second flow control portion 62 is of tubular form and surrounds the first flow control portion 60. The flow control portions 60 and 62 overlap in an axial direction of the axis L in an overlap region UB (see also FIG. 3) over a predetermined axial extent. By means of the flow control portions 60 and 62, the flow rate or flow speed of an air stream flowing into the control valve housing 22 to the first valve seat 52 can be controlled. The flow control portions 60 and 62 interact for the purposes of controlling the outside air flowing into the control valve housing 22. For this purpose, the flow control portions 60 and 62 between them form a flow channel SK (see FIG. 3) with a predetermined cross section. For as long as the flow control portions 60 and 62 overlap in an axial direction during a relative movement between the actuating piston 24 and the guide sleeve 34, the cross section of the flow channel SK formed by them remains constant. The air stream flowing to the first valve seat 52 then also remains constant. The flow channel SK will be discussed in more detail below with reference to FIGS. 3 and 4.

Figure 3:
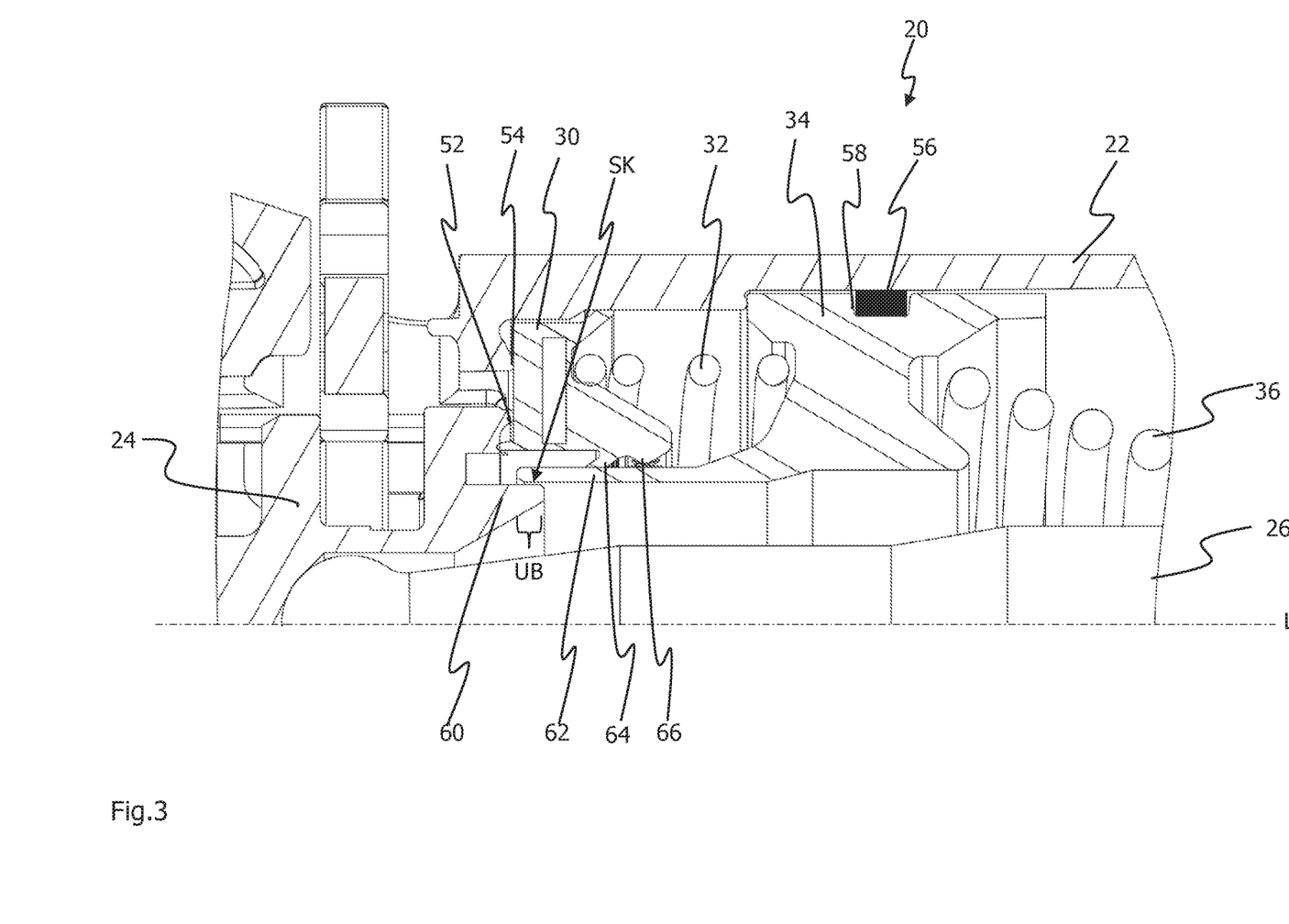
FIG. 3 shows an enlarged detail of the view of the control valve unit as per FIG. 2.

FIG. 3 shows an enlarged detail of the view as per FIG. 2, which detail is situated above the central longitudinal axis L in FIG. 2. FIG. 3 shows the control valve unit 20 in an initial position or a non-actuated position. In the initial position, the first flow control portion 60 of the actuating piston 24 and the second flow control portion 62 of the guide sleeve 34 overlap in an axial direction in an axial overlap region UB with a predetermined axial extent along the axis L. The flow channel SK is defined, with a predetermined cross section, between the outer circumferential surface of the first flow control portion 60 and the inner circumferential surface of the second flow control portion 62. In the state shown in FIG. 3, the flow channel SK has an annular cross section. The air flowing into the control valve housing 22 flows through the flow channel SK to the first valve seat 52. Flow rate control of the air stream to the first valve seat 52 is realized by means of the flow control portions 60 and 62. In the position of the actuating piston 24 relative to the guide sleeve 34 as shown in FIG. 3, the air stream to the first valve seat 52 is throttled. By means of this control of the air stream, it is possible to prevent vibrations at the brake pedal, which are perceptible to the driver, and also undesired noises in the footwell of the vehicle. The predetermined axial extent of the axial overlap region UB defines the length of time for which the cross section of the flow channel SK remains constant during a relative movement between the guide sleeve 34 and the actuating piston 24. When the first flow control portion 60 and the second flow control portion 62 no longer overlap, the cross section of the flow channel SK and thus also the air stream to the valve seat 52 increase.

The second flow control portion 62 extends through the valve element 30, which has two sealing lips 64 and 66. The valve element 30 lies with its sealing lips 64 and 66 sealingly against the second flow control portion 62.

Figure 4:
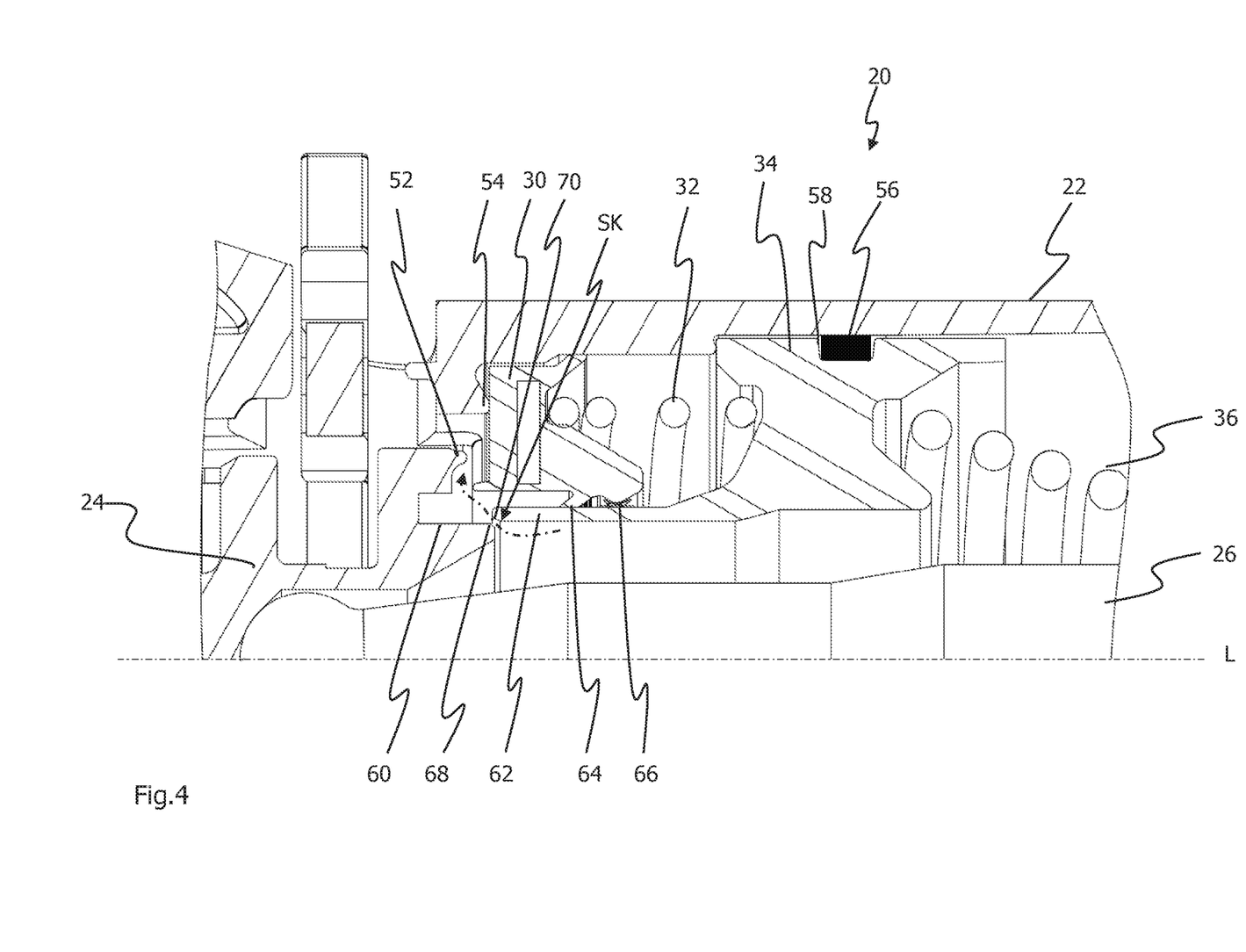
FIG. 4 shows an enlarged view of the control valve unit according to the first exemplary embodiment in the actuated state.

FIG. 4 shows an enlarged detail of the control valve unit 20, in which the actuating piston 24 has been displaced relative to the guide sleeve 34 owing to an actuation of the vacuum brake booster 10. Owing to the actuation of the control valve unit 20, the actuating piston 24 has been displaced to the left in the direction of the longitudinal axis L, and thus relative to the guide sleeve 34, by the force input member 26. Here, the first valve seat 52 has been lifted off from the valve element 30, and a connection has been produced between the working chamber 14 (see FIG. 1) and the atmosphere, such that ambient air can flow through the first valve seat 52 into the working chamber 14. Here, FIG. 4 shows the state that the actuating piston 24 and the guide sleeve 34 assume relative to one another by way of their flow control portions 60, 62 during an emergency braking operation, that is to say during a full braking operation. In this state, it is the intention for the greatest possible air stream to be able to pass to the first valve seat 52 in order to quickly build up the greatest possible boost force.

Viewing FIGS. 3 and 4, it is clear that the first flow control portion 60 of the actuating piston 24 and the second flow control portion 62 of the guide sleeve 34 overlap only slightly in the axial direction in FIG. 4, that is to say in the actuated state. The flow channel SK is delimited substantially by a bevel 68 on the first flow control portion 60 and a bevel 70 on the second flow control portion 62. The flow channel SK thus runs between the two bevels 68 and 70 of the flow control portions 60 and 62. The bevel 70 on the second flow control portion 60 is considerably larger than the bevel 68 on the first flow control portion 62. The cross section of the flow channel SK defined between the first flow control portion 60 and the second flow control portion 62 is thus considerably enlarged in the state shown in FIG. 4 in relation to the flow channel cross section in FIG. 3. The air stream, schematically illustrated by the arrow with a dash-dotted arrowed line, to the first valve seat 52 as illustrated in FIG. 4 in the opened state is thus scarcely or no longer throttled by the flow control portions 60 and 62.

Figure 5:
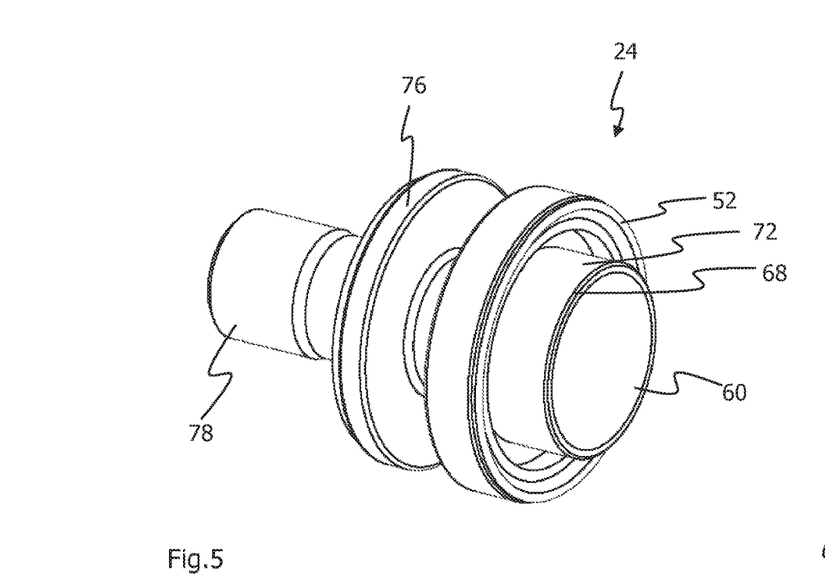
FIG. 5 shows a perspective view of an actuating piston.

FIG. 5 shows a perspective view of an actuating piston 24. The first valve seat 52 and the first flow control portion 60 are formed on the actuating piston 24. The first flow control portion 60 is formed in the manner of an encircling projection radially inwardly of the first valve seat 52 and has a predetermined radial spacing to the first valve seat 52.

An encircling bevel 68 is formed at the axial end side of the first flow control portion 60. The bevel 68 and the outer circumferential surface 72 of the first flow control portion 60 serve for the setting of the size of the cross section of the flow channel SK formed by the two flow control portions 60, 62 (see FIGS. 3 and 4).

The actuating piston 24 has a central, substantially axially running recess 74, which serves for receiving the spherical end of the force input member 26 (see FIGS. 1 and 2). The recess 74 extends through the first flow control portion 60.

The recess 74 has a conical portion which permits a deflection of the force input member 26 from the axis L.

Adjacent to the portion with the first valve seat 52 and the first flow control portion 60, the actuating piston 24 has a flange-like portion 76 which extends in a radial direction and which is spaced apart in an axial direction from the first valve seat 52 and from the flow control portion 60. The radial portion 76 is adjoined in an axial direction by a rod-shaped or bar-shaped portion 78, to which the plunger 42 (see FIG. 1) can be attached.

FIGS. 7 to 10 show various views of the guide sleeve 34. The guide sleeve 34 has an encircling groove 56 which is formed on the outer circumferential surface 80 of the guide sleeve 34. The guide sleeve 34 furthermore has an abutment portion 82 which extends substantially in a radial direction and which is provided between the outer circumferential surface 80 and the second flow control portion 62. The spring 32 can be supported on the abutment portion 82.

Figure 6:
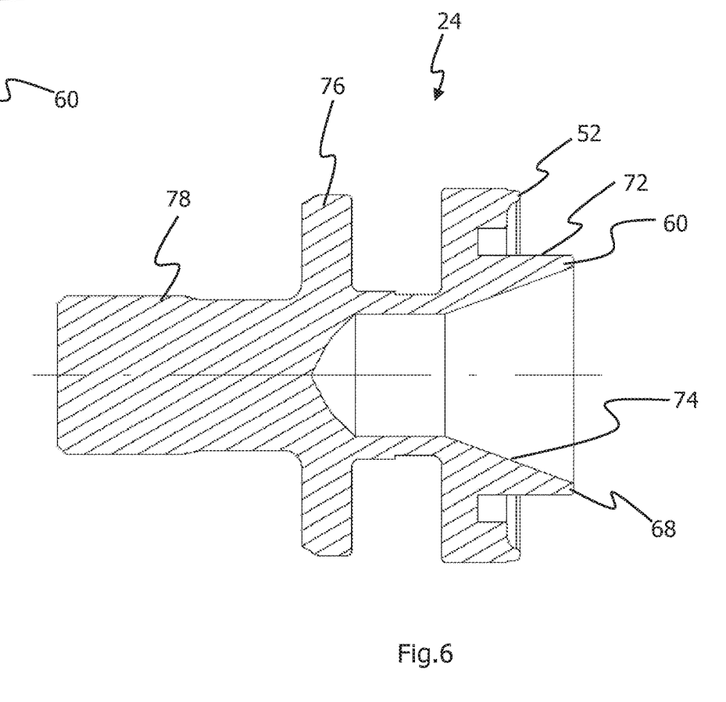
FIG. 6 shows a sectional view of the actuating piston as per FIG. 5.
Figures 7, 8, 9, 10:
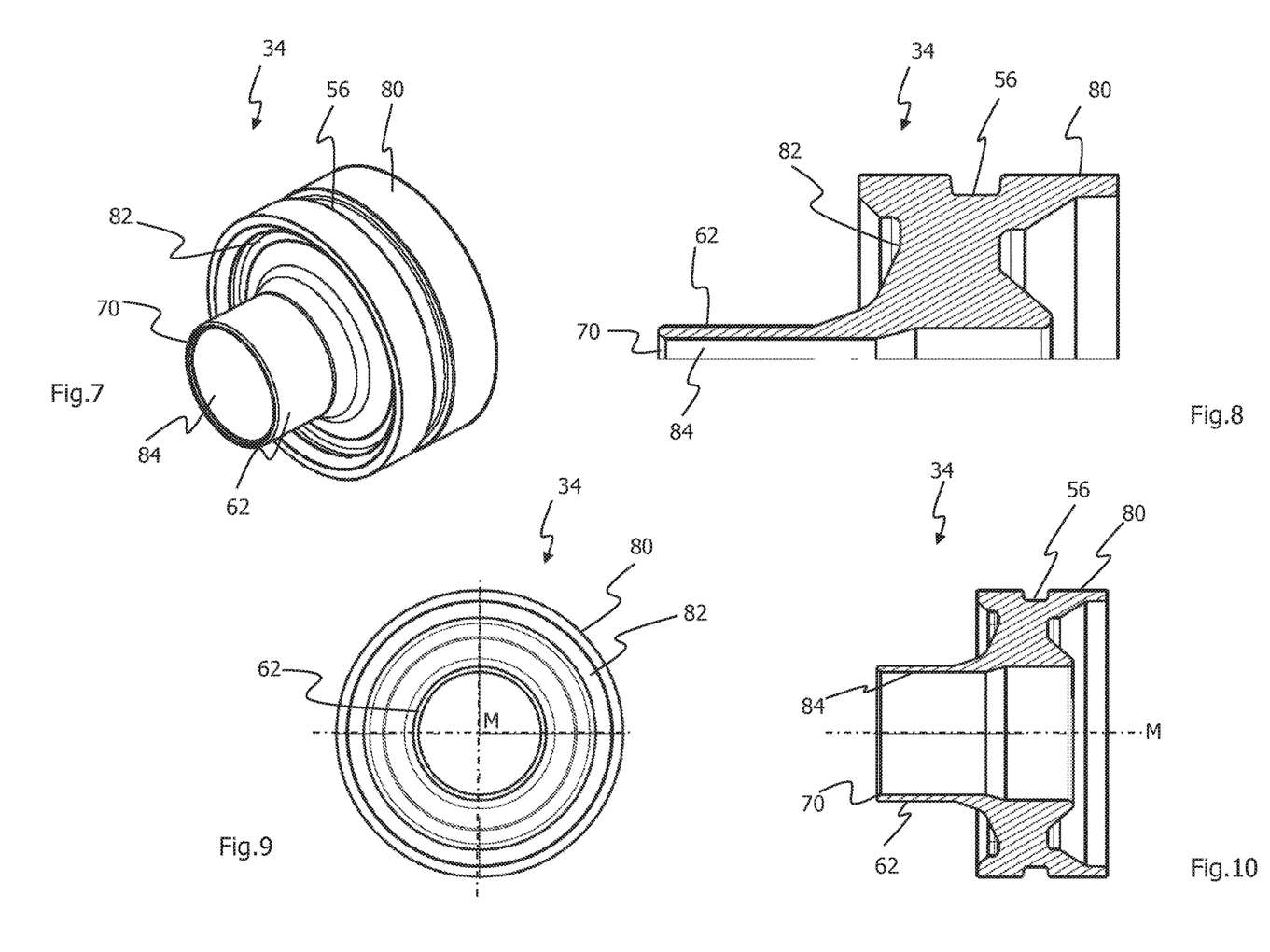
FIG. 7 shows a first view of a guide sleeve according to the first exemplary embodiment.
FIG. 8 shows a second view of a guide sleeve according to the first exemplary embodiment.
FIG. 9 shows a third view of a guide sleeve according to the first exemplary embodiment.
FIG. 10 shows a fourth view of a guide sleeve according to the first exemplary embodiment.

The second flow control portion 62 is of tubular form. The inner circumferential surface 84 of the second flow control portion 62 forms, together with the outer circumferential surface 72 of the first flow control portion 60 (see FIGS. 5 and 6), the flow channel SK for the air flowing into the vacuum brake booster. Provided on the inner circumferential surface 84 is the encircling bevel 70, which can likewise serve for the setting of the size of the flow channel cross section.

Figure 11:
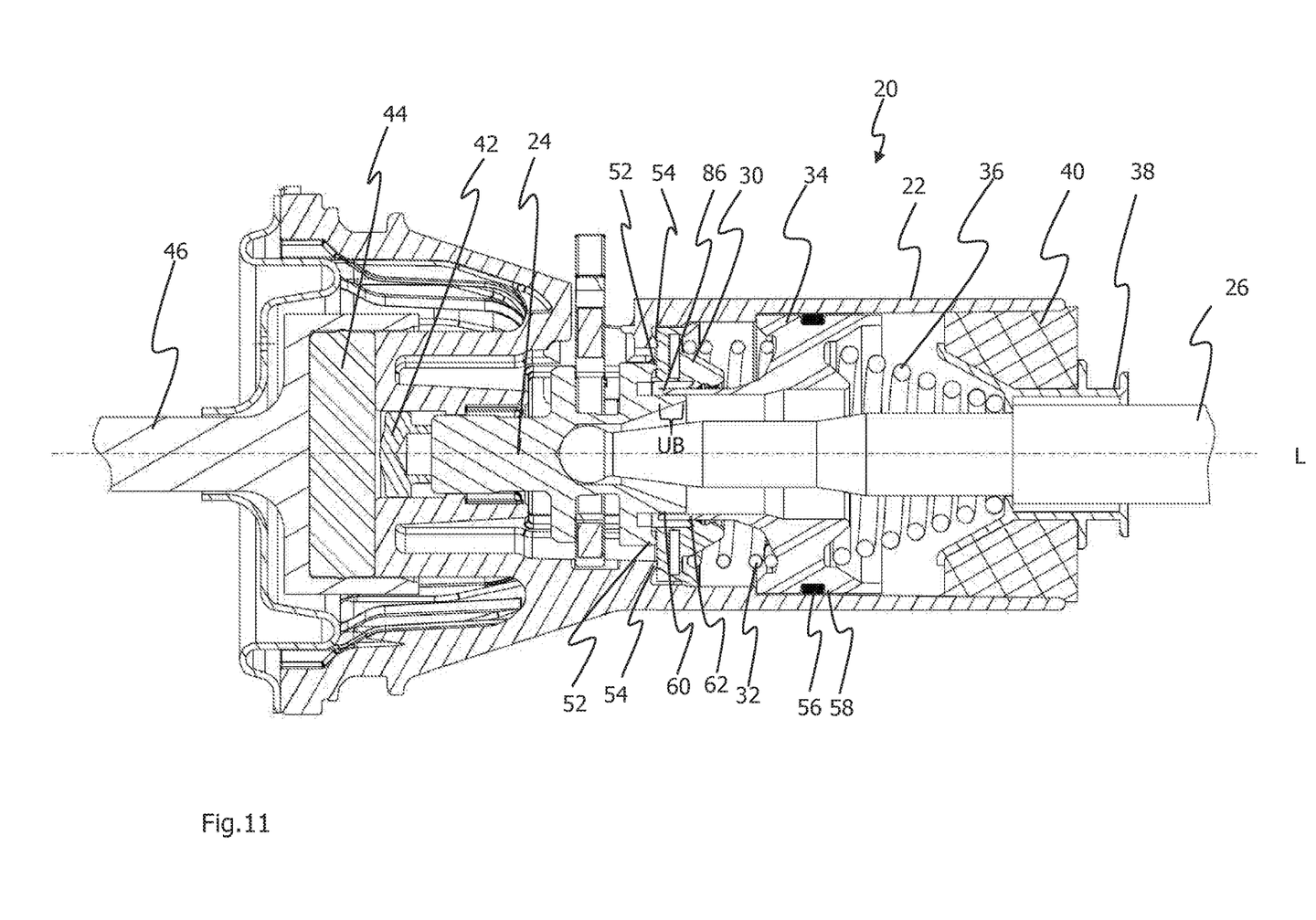
FIG. 11 shows a view of a control valve unit according to a second exemplary embodiment.

FIG. 11 shows a view of a control valve unit 20 according to a second exemplary embodiment. The main differences between the first exemplary embodiment and the second exemplary embodiment relate to the guide sleeve 34. The guide sleeve 34 has a flow control portion 62 which extends in tubular form in the direction of the actuating piston 24. A recess 86 can be seen at the axial end of the second flow control portion 62 in FIG. 11. The axial end of the flow control portion 62 is thus provided with a predetermined contour for the control of the air stream.

Figure 12:
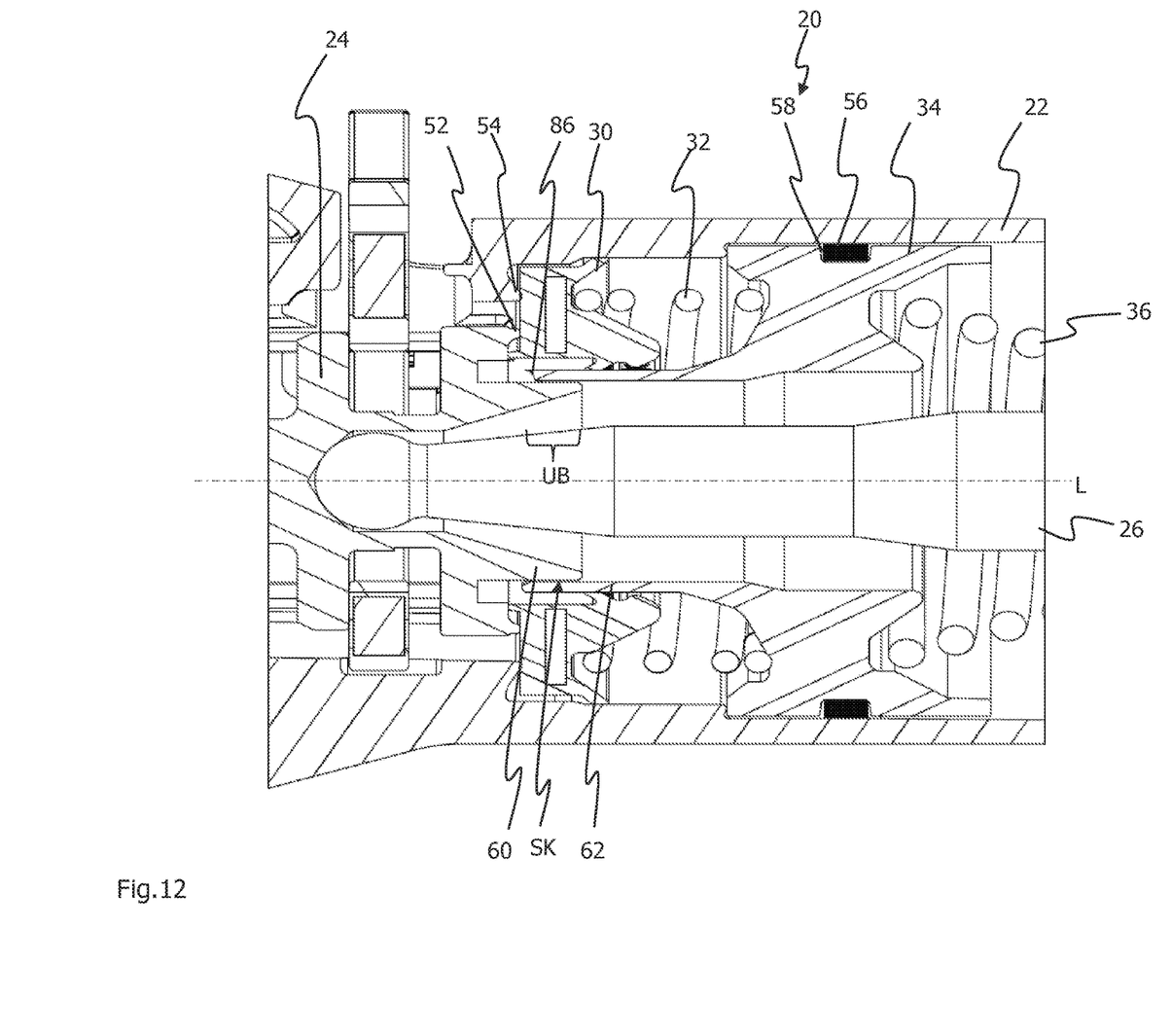
FIG. 12 shows an enlarged detail of the control valve unit as per FIG. 11.

FIG. 12 shows an enlarged detail of the control valve unit 20 according to the second exemplary embodiment. The actuating piston 24 corresponds substantially to the actuating piston 24 of the first exemplary embodiment. The differences between the two embodiments lie in the guide sleeve 34. The guide sleeve 34 has, at its flow control portion 62, the recess 86, which is formed at an axial end of the flow control portion 62. This becomes clear when one compares the region of the flow control portion 62 illustrated above the axis L in the view as per FIG. 12, with the recess 86, and the region below the axis L, without such a recess 86.

Figure 13:
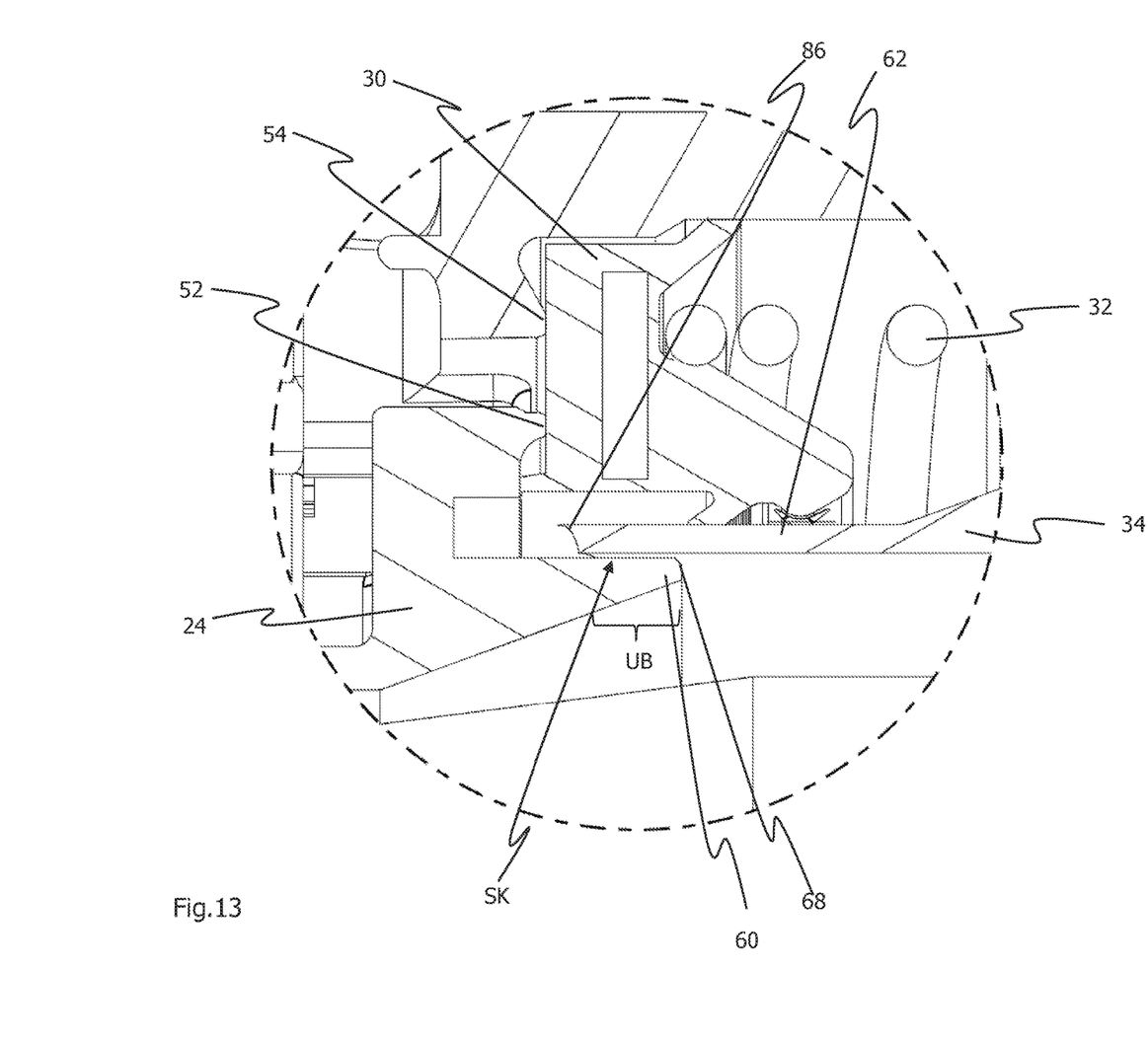
FIG. 13 shows an enlarged detail of the view of the control valve unit shown in FIG. 11, which detail is situated above the longitudinal axis of the control valve unit.

FIG. 13 shows an enlarged view of the region of the control valve unit 20 above the axis L from FIG. 12. The recess 86 can be seen at the axial end of the flow control portion 62 of the guide sleeve 34. For the control of the flow to the first valve seat 52, the flow control portion 62 is additionally equipped, in the region of the recess 86, with a predetermined contour. The recess 86 has a curved wall which has the effect that the flow control portion 62 tapers to a point at its axial end in the region of the recess 86.

Figure 14:
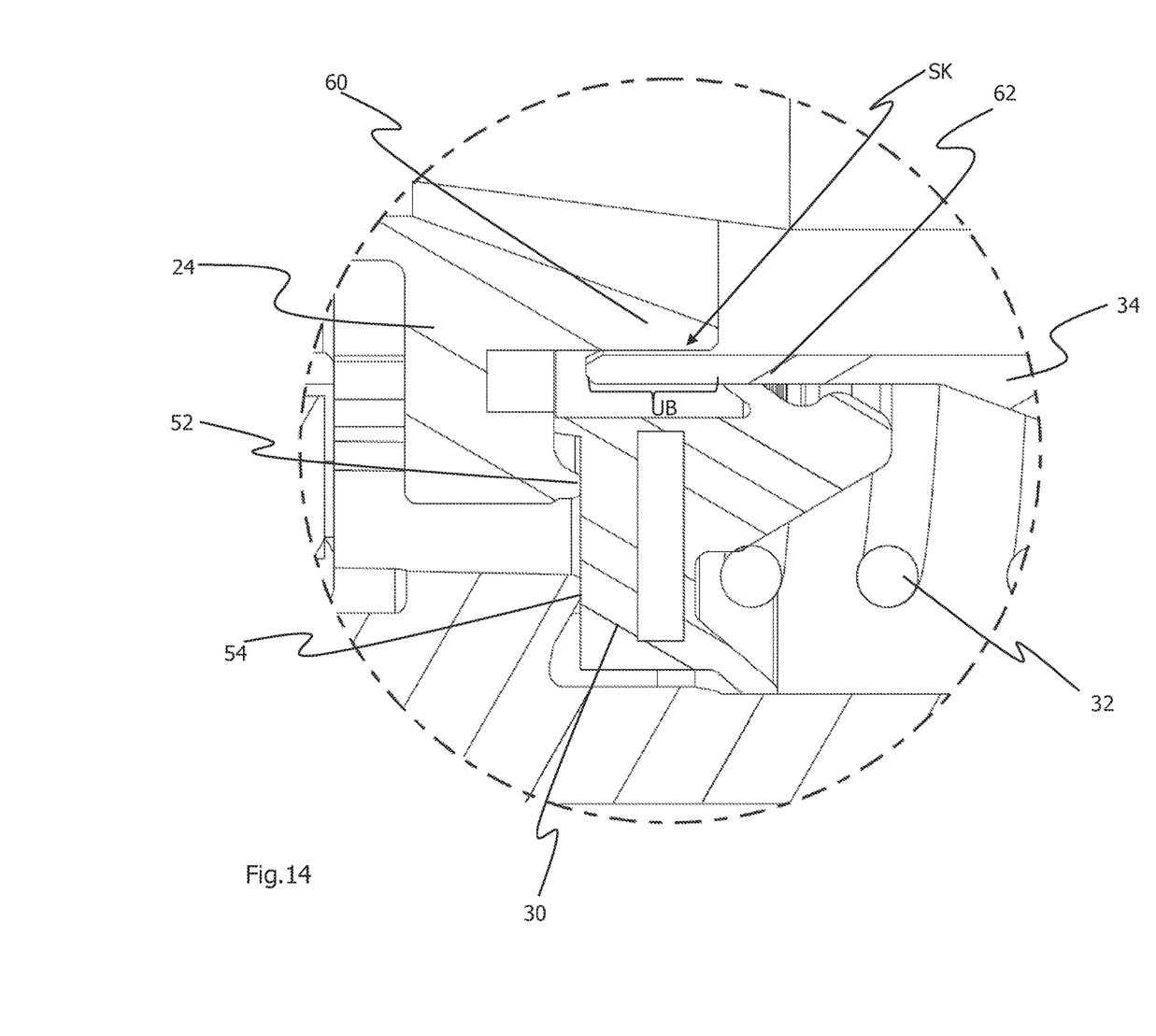
FIG. 14 shows an enlarged detail of the view of the control valve unit shown in FIG. 11, which detail is situated below the longitudinal axis of the control valve unit.
Figures 15, 16:
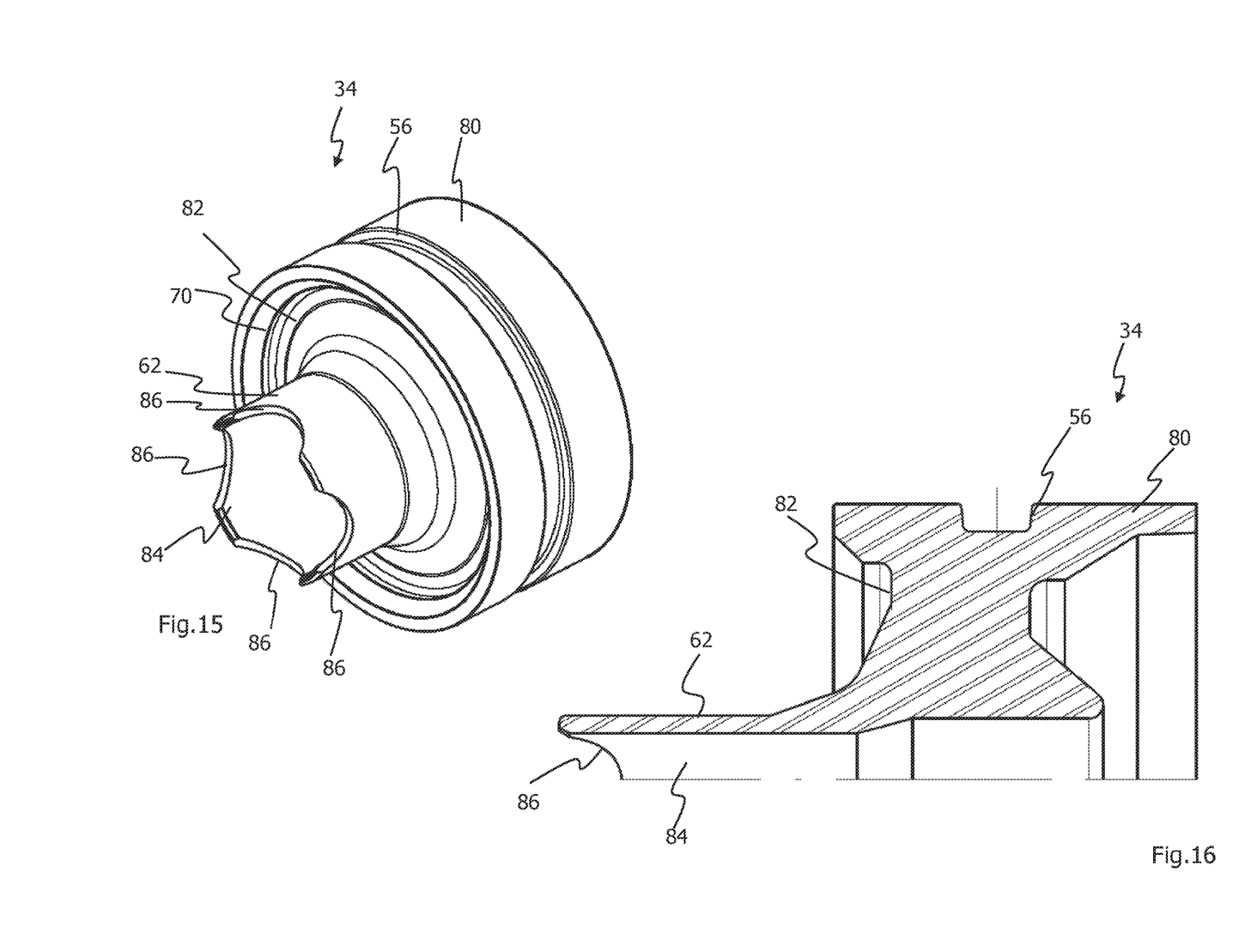
FIG. 15 shows a first view of a guide sleeve according to the second exemplary embodiment.
FIG. 16 shows a second view of a guide sleeve according to the second exemplary embodiment.
Figure 17:
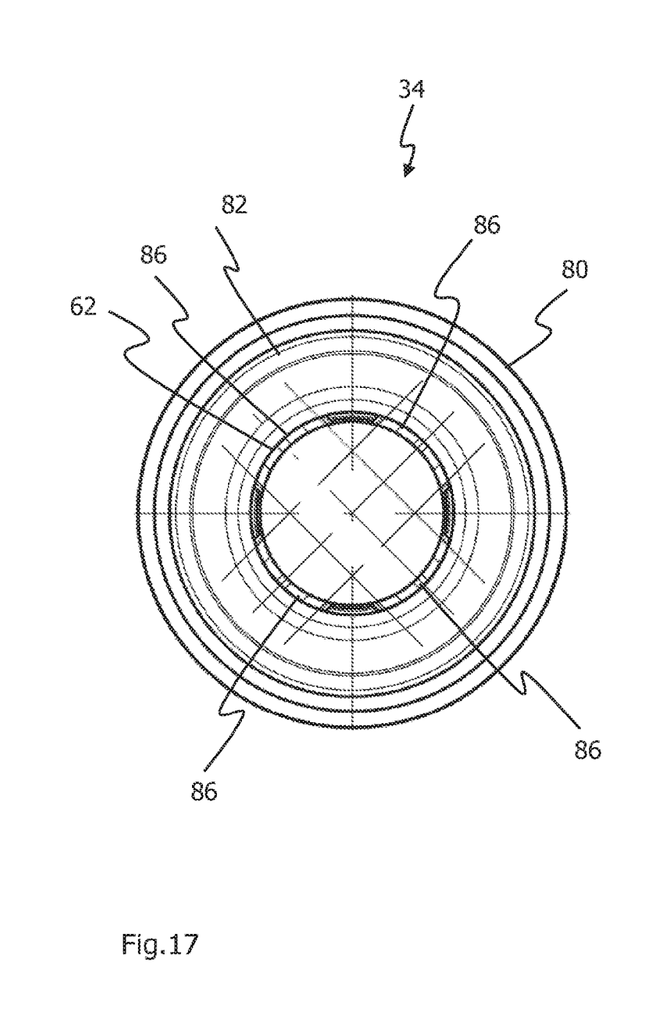
FIG. 17 shows a third view of a guide sleeve according to the second exemplary embodiment.
Figure 18:
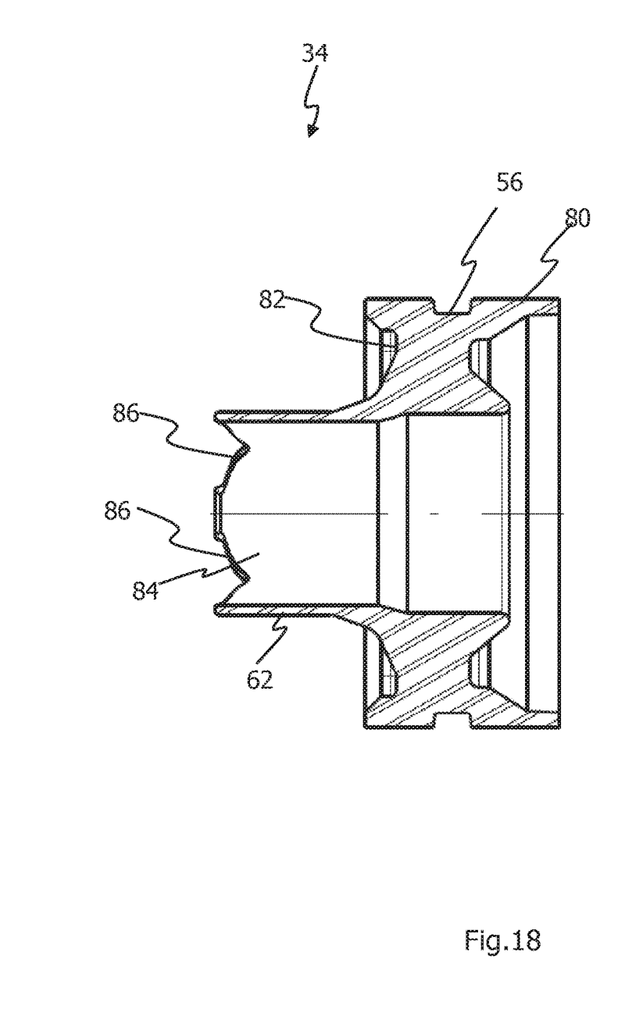
FIG. 18 shows a fourth view of a guide sleeve according to the second exemplary embodiment.

FIG. 14 shows an enlarged view of the region of the control valve unit 20 below the axis L from FIG. 12. In this region, no recess is formed on the second flow control portion 62.

FIGS. 15 to 18 show various views of the guide sleeve 34 according to the second exemplary embodiment. As already mentioned, the actuating piston 24 in the second exemplary embodiment corresponds to the actuating piston 24 of the first exemplary embodiment. The flow control portion 62 of the guide sleeve 34 has recesses 86 which extend in an axial direction into the flow control portion 62. The recesses 86 are of curved form such that they have their greatest extent in a circumferential direction at the axial end side of the tubular flow control portion 62. Here, four recesses 86 are provided which are distributed uniformly over the circumference of the flow control portion 62. As can be seen in particular in FIG. 18, the walls of the recesses 86 are inclined, that is to say run obliquely inward or so as to be inclined toward the central axis M of the guide sleeve 34.

The function of the vacuum brake booster 10 will be described below. The first flow control portion 60 of the actuating piston 24 and the second flow control portion 62 of the guide sleeve 34 control the flow rate of the air flowing to the first valve seat 52. The first valve seat 52 can connect the working chamber 14 to the atmosphere. The flow control portions 60 and 62 can throttle the air stream to the first valve seat 52 in order to prevent vibrations and undesired noises in the region of the brake pedal. For this purpose, the first flow control portion 60 and the second flow control portion 62 between them form the flow channel SK. In the first embodiment, for as long as the outer circumferential surface of the first flow control portion 60 and the inner circumferential surface of the second flow control portion 62 overlap in an axial direction, the cross section of the flow channel SK remains constant. In this embodiment, when the two flow control portions 60, 62 no longer overlap, the cross section of the flow channel SK increases, such that the air can flow unthrottled to the first valve seat 52. The flow channel SK can then be delimited for example by two corresponding bevels 68 and 70 on the flow control portions 60 and 62. This is the case for example during an emergency braking operation, when the greatest possible air stream should pass to the first valve seat 52.

The axial extents of the two flow control portions 60, 62 are coordinated with one another such that, in normal states of actuation, the air stream to the first valve seat 52 is throttled owing to the axial overlap of the two flow control portions 60, 62. However, during an emergency braking operation, owing to the large relative movement between the actuating piston 24 and the guide sleeve 34, the two flow control portions 60, 62 no longer overlap, or overlap still only to an extremely small extent, such that the air stream can flow unthrottled to the valve seat 52.

In the second exemplary embodiment, the second tubular flow control portion 62 of the guide sleeve 34 is formed so as to be longer in relation to the flow control portion 62 of the first exemplary embodiment. As a result, the flow control portions 60 and 62 overlap in all operating states of the control valve unit 20. The first flow control portion 60 thus projects into the second flow control portion 62 in all operating states. In the second exemplary embodiment, the desired enlargement of the flow cross section SK is realized by means of the recesses 86. The greater the relative movement between the guide sleeve 34 and the actuating piston 24, the larger the area of the recesses 86 that is opened up by the first flow control portion 60. The axial end side of the first flow control portion 60 predefines what region of the recesses 86 can be opened up and flowed through by an air stream to the first valve seat 52. The closer the axial end side of the first flow control portion 60 comes to the axial end side of the second flow control portion 62, the larger the area of the recesses 86 opened up by the first flow control portion 60 becomes. As a result of the increasing opening-up of the area of the recesses 86, the flow cross section of the flow channel SK, and thus the air stream to the first valve seat 52, also increase.

As in the first exemplary embodiment, it is also the case in the second exemplary embodiment that the cross section of the flow channel SK initially remains constant before being continuously enlarged as a result of the opening-up of the recesses 86. The throttling of the air stream or of the cross section of the flow channel SK can thus be controlled in a manner dependent on the extent of the relative movement between the actuating piston 24 and the guide sleeve 34, that is to say in a distance-dependent manner.

By means of the control of the air stream to the first valve seat 52, it is possible to prevent vibrations of the brake pedal and undesired noises in the vehicle compartment of the vehicle.

The invention claimed is:

1. A vacuum brake booster comprising:
at least one movable wall which separates a working chamber and a vacuum chamber in the vacuum brake booster from one another, and
a control valve unit which is coupled to the at least one movable wall,
wherein the control valve unit comprises a guide sleeve and an actuating piston which is guided displaceably in the control valve unit and which is actuatable by means of a force input member which is couplable to a brake pedal,
wherein the actuating piston has at least one first valve seat which, in the opened state, serves for connecting the working chamber to the surrounding atmosphere,
wherein the actuating piston has a first flow control portion, which projects in the direction of the guide sleeve, and the guide sleeve has a second flow control portion, which projects in the direction of the actuating piston and overlaps with the first flow control portion in an axial direction,
wherein the first flow control portion and the second flow control portion slide along and relative to one another for controlling the air stream flowing to the first valve seat.

2. The vacuum brake booster as defined in claim 1, wherein the first flow control portion and the second flow control portion between them define at least one flow channel (SK) for the air flowing to the first valve seat.

3. The vacuum brake booster as defined in claim 1, wherein the first flow control portion and the second flow control portion are designed such that the cross section of the at least one flow channel (SK) varies in a manner dependent on the magnitude of a preferably axial relative movement between the actuating piston and the guide sleeve.

4. The vacuum brake booster as defined in claim 3, wherein the first flow control portion and the second flow control portion are designed such that, during a relative movement between the actuating piston and the guide sleeve, the cross section of the at least one flow channel (SK) remains constant over a predetermined distance of the relative movement and increases after the predetermined distance has been overshot.

5. The vacuum brake booster as defined in claim 1, wherein at least one valve element is provided which interacts with the at least one first valve seat and which bears against the second flow control portion.

6. The vacuum brake booster as defined in claim 5, wherein the first flow control portion and/or the second flow control portion have at least one element for varying the cross section of the flow channel (SK).

7. The vacuum brake booster as defined in claim 1, wherein the air stream is incapable of flowing through the first and second flow control portions.

8. A vacuum brake booster comprising:
at least one movable wall which separates a working chamber and a vacuum chamber in the vacuum brake booster from one another, and
a control valve unit which is coupled to the at least one movable wall,
wherein the control valve unit comprises a guide sleeve and an actuating piston which is guided displaceably in the control valve unit and which is actuatable by means of a force input member which is couplable to a brake pedal,
wherein the actuating piston has at least one first valve seat which, in the opened state, serves for connecting the working chamber to the surrounding atmosphere,
wherein the actuating piston has a first flow control portion, which projects in the direction of the guide sleeve, and the guide sleeve has a second flow control portion, which projects in the direction of the actuating piston, wherein the first flow control portion is formed on the actuating piston radially inwardly of the first valve seat;
wherein the first flow control portion and the second flow control portion interact for controlling the air stream flowing to the first valve seat.

9. A vacuum brake booster comprising:
at least one movable wall which separates a working chamber and a vacuum chamber in the vacuum brake booster from one another, and
a control valve unit which is coupled to the at least one movable wall,
wherein the control valve unit comprises a guide sleeve and an actuating piston which is guided displaceably in the control valve unit and which is actuatable by means of a force input member which is couplable to a brake pedal,
wherein the actuating piston has at least one first valve seat which, in the opened state, serves for connecting the working chamber to the surrounding atmosphere,
wherein the actuating piston has a first flow control portion, which projects in the direction of the guide sleeve, and the guide sleeve has a second flow control portion, which projects in the direction of the actuating piston, wherein the second flow control portion is tubular and receives the first flow control portion at least in certain portions;
wherein the first flow control portion and the second flow control portion interact for controlling the air stream flowing to the first valve seat.

10. The vacuum brake booster as defined in claim 9, wherein the first flow control portion slides along an inner surface of the tubular second flow control portion.

* * * * *